United States Patent
Iwama et al.

(10) Patent No.: US 9,487,713 B2
(45) Date of Patent: Nov. 8, 2016

(54) METHOD FOR PRODUCING HYDROCARBON OIL

(75) Inventors: Marie Iwama, Tokyo (JP); Kazuhiko Tasaka, Tokyo (JP); Yuichi Tanaka, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 602 days.

(21) Appl. No.: 13/983,432

(22) PCT Filed: Jan. 31, 2012

(86) PCT No.: PCT/JP2012/052149
§ 371 (c)(1),
(2), (4) Date: Oct. 3, 2013

(87) PCT Pub. No.: WO2012/105559
PCT Pub. Date: Aug. 9, 2012

(65) Prior Publication Data
US 2014/0021095 A1    Jan. 23, 2014

(30) Foreign Application Priority Data
Feb. 4, 2011    (JP) .............................. P2011-022916

(51) Int. Cl.
*C10G 47/36*    (2006.01)
*C10G 49/02*    (2006.01)
(Continued)

(52) U.S. Cl.
CPC .............. *C10G 47/36* (2013.01); *B01J 29/126* (2013.01); *C10G 47/02* (2013.01); *C10G 49/26* (2013.01);
(Continued)

(58) Field of Classification Search
CPC B01J 2229/20; B01J 2229/42; B01J 29/126; B01J 37/0009; C10G 2300/1022; C10G 2300/301; C10G 47/02; C10G 47/36; C10G 49/26
See application file for complete search history.

(56) References Cited

U.S. PATENT DOCUMENTS 2,723,946 A    11/1955   Donaldson
3,158,563 A    11/1964   Strecker
(Continued)

FOREIGN PATENT DOCUMENTS

AU    2007213211 B2    8/2007
AU    2007232010        11/2007
(Continued)

OTHER PUBLICATIONS

Australian Patent Examination Report for Application No. 2012211757, which was issued Mar. 19, 2015.
(Continued)

*Primary Examiner* — Renee E Robinson
*Assistant Examiner* — Derek Mueller
(74) *Attorney, Agent, or Firm* — Greenblum & Bernstein, P.L.C.

(57) ABSTRACT

The present invention provides a method for producing a hydrocarbon oil, including performing a hydrocracking by continuously feeding, to a hydrocracking reactor containing a hydrocracking catalyst, a wax to be processed including: a raw wax containing 70% by mass or more of straight-chain hydrocarbons with a boiling point of higher than 360° C; and an uncracked wax containing 70% by mass or more of straight-chain hydrocarbons with a boiling point of higher than 360° C, which uncracked wax is separated from a hydrocracking product discharged from the reactor, to thereby yield a hydrocarbon oil including hydrocarbons with a boiling point of 360° C or lower.

2 Claims, 3 Drawing Sheets

(51) Int. Cl.
*C10G 49/26* (2006.01)
*B01J 29/12* (2006.01)
*C10G 47/02* (2006.01)
*B01J 37/00* (2006.01)

(52) U.S. Cl.
CPC ......... *B01J 37/0009* (2013.01); *B01J 2229/20* (2013.01); *B01J 2229/42* (2013.01); *C10G 2300/1022* (2013.01); *C10G 2300/301* (2013.01)

(56) References Cited

U.S. PATENT DOCUMENTS

| | | | |
|---|---|---|---|
| 3,436,338 | A | 4/1969 | Pratt et al. |
| 5,520,799 | A | 5/1996 | Brown et al. |
| 7,655,134 | B2 | 2/2010 | Dierickx et al. |
| 2007/0151902 | A1 | 7/2007 | Aoki et al. |
| 2008/0314800 | A1 | 12/2008 | Dierickx et al. |
| 2009/0159490 | A1 | 6/2009 | Seki et al. |
| 2011/0049011 | A1 * | 3/2011 | Tanaka ............ C10G 47/00 208/85 |

FOREIGN PATENT DOCUMENTS

| | | |
|---|---|---|
| CN | 1031558 | 3/1989 |
| CN | 101040033 | 9/2007 |
| CN | 101068907 | 11/2007 |
| CN | 101356253 | 1/2009 |
| CN | 101405372 | 4/2009 |
| EP | 0 104 807 | 4/1990 |
| EP | 1 953 208 | 8/2008 |
| EP | 2 275 515 | 1/2011 |
| JP | 2004-323626 | 11/2004 |
| JP | 2007-204506 | 8/2007 |
| JP | 2007-211057 | 8/2007 |
| JP | 2007-246663 | 9/2007 |
| JP | 2007-269897 | 10/2007 |
| WO | 2007-086299 | 8/2007 |
| WO | 2007-097235 | 8/2007 |
| WO | 2007/113962 | 10/2007 |
| WO | WO2009/113574 A1 * | 11/2009 ............ C10G 47/36 |

OTHER PUBLICATIONS

Search Report issued by European Patent Office (EPO) in EPO Patent Application No. 12741692.3, dated Dec. 17, 2015.
Office Action for Chinese Patent Application No. 201280007617.5, which was mailed on Apr. 30, 2014.
English translation of the International Preliminary Report on Patentability for PCT/JP2012/052149, mailed on Aug. 15, 2013.
International Search Report for PCT/JP2012/052149, mailed on Mar. 13, 2012; along with an English translation.

* cited by examiner

METHOD FOR PRODUCING HYDROCARBON OIL

TECHNICAL FIELD

The present invention relates to a method for producing a hydrocarbon oil.

BACKGROUND ART

Recently, from the viewpoint of increase in environmental consciousness, liquid fuels in which the contents of environmental load substances such as sulfur and aromatic hydrocarbons are small have been demanded. From such a viewpoint, as a technique which can produce a base stock for fuel oil that substantially contains neither sulfur nor aromatic hydrocarbons and is rich in aliphatic hydrocarbons, particularly, a base stock for kerosene and gas oil, a method using a Fischer-Tropsch synthesis reaction (hereinafter, also referred to as the "FT synthesis reaction" in some cases) in which carbon monoxide gas and hydrogen gas are used as raw materials has been examined (see Patent Literature 1, for example).

A synthetic oil obtained by the FT synthesis reaction (hereinafter, also referred to as the "FT synthetic oil" in some cases) is a mixture containing aliphatic hydrocarbons with a wide carbon number distribution as a main component. From this FT synthetic oil, a naphtha fraction containing mainly a component with a boiling point of lower than 150° C.; a middle distillate containing mainly a component with a boiling point of about 150° C. to about 360° C.; and a wax fraction containing mainly a hydrocarbon component heavier than the middle distillate (with a boiling point of higher than about 360° C.) (hereinafter, referred to also as the "FT wax fraction" in some cases) can be obtained. Among the respective fractions, the middle distillate is the most useful fraction corresponding to a base stock for kerosene and gas oil and is desired to be obtained with a high yield. Therefore, in an upgrading section of hydroprocessing and fractionating the FT synthetic oil to obtain a base stock for fuel oil, the FT wax fraction produced in a significant amount with the middle distillate in the FT synthesis reaction step is converted to a component corresponding to the middle distillate through the hydrocracking to reduce molecular weight, thereby enhancing the yield of the middle distillate as a whole.

The FT wax fraction obtained from the FT synthetic oil by fractionating is hydrocracked in a wax fraction hydrocracking reactor packed with a hydrocracking catalyst, and then separated into gas and liquid in a gas liquid separation apparatus. Then, the liquid component thus obtained (hydrocarbon oil) is sent to a fractionator at the following stage along with the middle distillate preliminarily fractionated from the FT synthetic oil and separately hydrotreated, and the middle distillate (kerosene and gas oil fraction) is obtained by fractionating. In this case, a heavy component containing an uncracked wax (bottom oil) which has not been sufficiently hydrocracked in the wax fraction hydrocracking reactor is recovered from the bottom of the fractionator. The entire amount of the bottom oil is recycled, fed to the wax fraction hydrocracking reactor again along with the FT wax fraction from the FT synthesis reaction section, and hydrocracked (see Patent Literature 2, for example).

While an operation is performed in the wax fraction hydrocracking reactor with a cracking rate described later being set so as to maximize the yield of the middle distillate, the hydrocracking catalyst packed in the reactor degrades and an activity thereof decreases with the time on operation, and the yield of the middle distillate reduces with the decrease in cracking rate. Then, adjustments are usually made so that the cracking rate is constantly maintained by raising a reaction temperature over time for compensating for the decrease in activity of the catalyst. This reaction temperature rises with the passage of operation time, an apparatus is stopped at the time of reaching the upper limit temperature of the catalyst or apparatus, and replacement or regeneration of the catalyst is performed. Therefore, in order to improve a production efficiency of the hydrocarbon oil, there is a demand for making it possible to suppress the degradation of the hydrocracking catalyst over time and use the catalyst continuously for a longer time.

As a device for suppressing the degradation of the hydrocracking catalyst and extending a continuous use time of the catalyst, a method has been proposed in which a raw material is temporarily switched from a wax fraction to light paraffin hydrocarbons at the stage that the degradation of the catalyst over time is caused, an activity of the catalyst is allowed to be recovered, and thereafter the raw material is returned to the wax fraction (see Patent Literature 3, for example).

CITATION LIST

Patent Literature

[Patent Literature 1] Japanese Patent Application Laid-Open Publication No. 2004-323626

[Patent Literature 2] Japanese Patent Application Laid-Open Publication No. 2007-204506

[Patent Literature 3] Japanese Patent Application Laid-Open Publication No. 2007-211057

SUMMARY OF INVENTION

Technical Problem

However, in the case of the method described in Patent Literature 3, there was a problem that during a period that the light paraffin hydrocarbons are fed to the wax fraction hydrocracking reactor, the primary hydrocracking of the wax fraction is not carried out, thereby causing the reduction in efficiency of hydrocracking of the wax fraction.

The present invention has been made in consideration of such circumstances, and an object of the present invention is to provide a method for producing a hydrocarbon oil which can suppress the degradation of a hydrocracking catalyst and extend a continuous use time of the catalyst without reducing the efficiency of hydrocracking of a wax fraction.

Solution to Problem

In order to solve the problem above, the present invention provides a method for producing a hydrocarbon oil, comprising hydrocracking by continuously feeding, to a hydrocracking reactor containing a hydrocracking catalyst, a wax to be processed comprising: a raw wax containing 70% by mass or more of straight-chain hydrocarbons with a boiling point of higher than 360° C.; and an uncracked wax containing 70% by mass or more of straight-chain hydrocarbons with a boiling point of higher than 360° C., which uncracked wax is separated from a hydrocracking product discharged from the reactor, to thereby yield a hydrocarbon oil comprising hydrocarbons with a boiling point of 360° C. or lower, wherein the following periods are alternately provided: a period for performing hydrocracking of the wax to be processed under a condition where a cracking rate defined by the following formula (1) is $X_1$(%) satisfying the following formula (2); and a period for performing hydrocracking of the wax to be processed under a condition where the cracking rate is $X_2$(%) satisfying the following formula (3), Cracking rate (%)=((content of hydrocarbons with boiling point of higher than 360° C. in 1 g of wax to be processed)−(content of hydrocarbons with boiling point of higher than 360° C. in 1 g of hydrocracking product))×100/(content of hydrocarbons with boiling point of higher than 360° C. in 1 g of wax to be processed)    (1);

$30 \leq X_1 \leq 90$    (2); and $0.1 \leq X_2/X_1 \leq 0.9$    (3).

According to the method for producing a hydrocarbon oil of the present invention, a block operation is performed at a specified cracking rate and a lower specified cracking rate than the specified cracking rate upon hydrocracking the wax fraction, thereby making it possible to suppress the degradation of the hydrocracking catalyst over time and extend a continuous use time, and thus making it possible to extend a continuous operation time of the wax fraction hydrocracking reactor and improve a production efficiency of the hydrocarbon oil. Here, it is to be noted that the "block operation" means an operation where an operation is performed under the predetermined operation condition for a certain period of time and an operation is subsequently further performed under the altered condition for a certain period of time, or an operation where these operations are repeated.

Preferably, in the method for producing a hydrocarbon oil of the present invention, the raw wax comprises a wax produced by a Fischer-Tropsch synthesis reaction.

The raw wax comprises a wax produced by a Fischer-Tropsch synthesis reaction, thereby remarkably exerting an effect of extending a continuous operation time of the hydrocracking catalyst due to performing the block operation.

Advantageous Effects of Invention

According to the present invention, the method for producing a hydrocarbon oil can be provided which can suppress the degradation of a hydrocracking catalyst and extend a continuous use time without reducing the efficiency of hydrocracking of a wax fraction.

DESCRIPTION OF EMBODIMENTS

Figure 1:
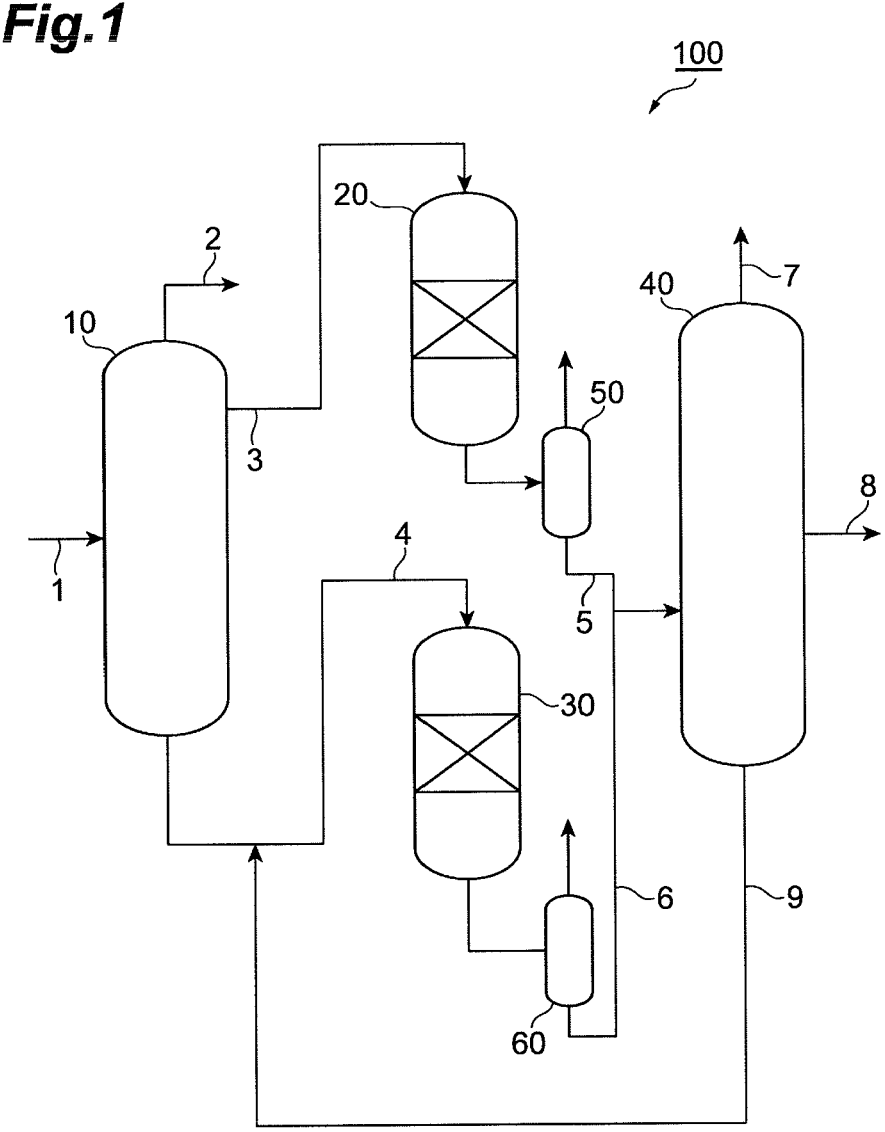
FIG. 1 is a schematic configuration view of an apparatus for producing a hydrocarbon oil in which one embodiment of a method for producing a hydrocarbon oil of the present invention is carried out.

FIG. 1 is a schematic configuration view of an apparatus for producing a hydrocarbon oil in which one embodiment of a method for producing a hydrocarbon oil of the present invention is carried out.

Hereinafter, a method for producing a hydrocarbon oil will be described in detail with reference to an example, which is a suitable embodiment of the present invention, in which a raw wax comprises a wax fraction (FT wax fraction) obtained from a FT synthetic oil.

An apparatus for producing a hydrocarbon oil 100 shown in FIG. 1 comprises a first fractionator 10 of fractionating a FT synthetic oil fed from a FT synthesis reaction apparatus (not shown) through a line 1, to a naphtha fraction, a middle distillate and a wax fraction (FT wax fraction), a middle distillate hydrotreating reactor 20 of hydrotreating and hydro-isomerizing the middle distillate fed from the middle of the first fractionator 10 by a line 3, and a wax fraction hydrocracking reactor 30 of hydrocracking a FT wax fraction fed from the bottom portion of the first fractionator 10 by a line 4. The naphtha fraction is fed to a naphtha fraction hydrotreating reactor (not shown) of hydrotreating the naphtha fraction, and the like, from the top of the first fractionator 10 by a line 2. The middle distillate hydrotreating reactor 20 is preferably packed with a hydrotreating catalyst as a fixed bed. The middle distillate is mixed with hydrogen gas fed by a hydrogen gas feed line (not shown), heated to a reaction temperature by a heating device (not shown) such as a heat exchanger provided on the line 3, thereafter fed to the middle distillate hydrotreating reactor 20, and hydrotreated and hydro-isomerized. The wax fraction hydrocracking reactor 30 is preferably packed with a hydrocracking catalyst as a fixed bed. The FT wax fraction is mixed with an uncracked wax (described later in detail) sent back by a line 9 to form a wax to be processed, this wax to be processed is mixed with hydrogen gas fed by a hydrogen gas feed line (not shown), heated to a reaction temperature by a heating device (not shown) such as a heat exchanger provided on the line 4, and thereafter fed to the wax fraction hydrocracking reactor 30 and hydrocracked.

The apparatus for producing a hydrocarbon oil 100 comprises gas liquid separators 50 and 60 downstream of the middle distillate hydrotreating reactor 20 and the wax fraction hydrocracking reactor 30, respectively, and further comprises a second fractionator 40 to which liquid hydrocarbons transferred from the gas liquid separator 50 by a line 5 and liquid hydrocarbons transferred from the gas liquid separator 60 by a line 6 are fed and in which a mixture of them is fractionated. The second fractionator 40 is provided with lines 7, 8 and 9 for discharging the respective fractionated fractions. In the present embodiment, for example, a light fraction containing the naphtha fraction can be discharged by the line 7, the desired middle distillate can be discharged by the line 8, and a bottom oil being the uncracked wax can be discharged by the line 9. This bottom oil is sent back to the line 4 upstream of the wax fraction hydrocracking reactor 30, fed to the wax fraction hydrocracking reactor 30, and undergoes hydrocracking again.

It is to be noted that the "uncracked wax" herein refers to a component containing 70% by mass or more of straight-chain hydrocarbons with a boiling point of higher than 360° C., which is discharged from the bottom of the second fractionator 40, because of a part of the straight-chain hydrocarbons with a boiling point of higher than 360° C. in the wax for processing is discharged from the wax fraction hydrocracking reactor 30 without being hydrocracked to the upper limit (approximately 360° C.) or lower of the middle distillate boiling point. In addition, the "hydrocracking product" means all products comprising the uncracked wax discharged from the wax fraction hydrocracking reactor 30, unless otherwise noted.

Liquid hydrocarbons separated from products discharged from the middle distillate hydrotreating reactor 20 and liquid hydrocarbons separated from the hydrocracking product discharged from the wax fraction hydrocracking reactor 30, to be fed to the second fractionator 40, may be mixed in line blending or in tank blending.

In the present embodiment, the entire amount of the uncracked wax being the bottom oil of the second fractionator 40 is sent back to the line 4 upstream of the wax fraction hydrocracking reactor 30 by the line 9, and a mixture of the FT wax fraction fed from the first fractionator 10 and the uncracked wax is hydrocracked as a wax to be processed in the wax fraction hydrocracking reactor 30 under the condition according to the present invention.

The FT synthetic oil comprising the FT wax fraction used as the raw wax in the present embodiment is not particularly limited as long as it is synthesized by the FT synthesis method, but it preferably contains 80% by mass or more of hydrocarbons with a boiling point of about 150° C. or higher based on the whole mass of the FT synthetic oil from the viewpoint of efficiently producing the middle distillate. In addition, the FT synthetic oil is usually produced by a known FT synthesis reaction method and is a mixture containing aliphatic hydrocarbons with a wide carbon number distribution as a main component, but it may also be a fraction obtained by appropriately fractionating the mixture in advance.

The aliphatic hydrocarbons that constitute the FT synthetic oil include unsaturated hydrocarbons (olefins) as impurities. In addition, the FT synthetic oil includes oxygen-containing compounds having an oxygen atom derived from carbon monoxide, such as alcohols, as impurities other than the aliphatic hydrocarbons.

It is to be noted that a method of producing carbon monoxide gas and hydrogen gas used as raw materials of the FT synthesis method is not particularly limited, but a method is preferably adopted in which synthesis gas containing carbon monoxide and hydrogen gas as main components is produced from gaseous hydrocarbons such as natural gas by a reforming reaction, and this synthesis gas is used.

The naphtha fraction is for example a component distilled in the first fractionator 10 at a temperature of lower than about 150° C., the middle distillate is for example a component distilled in the first fractionator 10 at a temperature of about 150° C. or higher and about 360° C. or lower, and the FT wax fraction is for example a component not distilled in the first fractionator 10 at a temperature of about 360° C. and discharged from the bottom. Here, an example is illustrated as a preferable embodiment, in which two cut points (namely, about 150° C. and about 360° C.) are set in the first fractionator 10 and fractionated to three fractions, but one cut point is set, a fraction not higher than the cut point is introduced as the middle distillate from a line 13 to the middle distillate hydrotreating reactor 20, and a fraction higher than the cut point is discharged as the FT wax fraction from the line 4.

In the naphtha fraction hydrotreating reactor, the naphtha fraction is hydrotreated by a known method, the olefins contained in the naphtha fraction are converted to saturated hydrocarbons by hydrogenation, and the oxygen-containing compounds such as alcohols are converted to hydrocarbons and water by hydro-deoxygenation.

In the middle distillate hydrotreating reactor 20, as in the naphtha fraction hydrotreating reactor, the olefins and the oxygen-containing compounds contained in the middle distillate are converted to saturated hydrocarbons by a known method (hydrotreating reaction). At the same time, in the case of obtaining a base stock for fuel oil as a produced oil, at least one part of normal paraffins contained in the middle distillate is converted to isoparaffins (Hydro-isomerization reaction) for the purpose of improving low temperature property (fluidity at a low temperature).

To the wax fraction hydrocracking reactor 30, the wax to be processed which is a mixture of the FT wax fraction as a raw wax containing 70% by mass or more of straight-chain hydrocarbons with a boiling point of higher than 360° C. and of the bottom oil of the second fractionator 40 as an uncracked wax containing 70% by mass or more of straight-chain hydrocarbons with a boiling point of higher than 360° C., is continuously fed and hydrocracked. In this hydrocracking, the hydrocracking according to the present invention is carried out in which the following periods are alternately provided: a period for performing hydrocracking under a condition where a cracking rate of the wax to be processed defined by the following formula (1) is $X_1$(%) satisfying the following formula (2) (hereinafter, also referred to as the "hydrocracking at a high cracking rate" in some cases); and a period for performing hydrocracking under a condition where the cracking rate is $X_2$(%) satisfying the following formula (3) (hereinafter, also referred to as the "hydrocracking at a low cracking rate" in some cases), Cracking rate (%)=((content of hydrocarbons with boiling point of higher than 360° C. in 1 g of wax to be processed)−(content of hydrocarbons with boiling point of higher than 360° C. in 1 g of hydrocracking product))×100/(content of hydrocarbons with boiling point of higher than 360° C. in 1 g of wax to be processed)      (1);

$30 \leq X_1 \leq 90$      (2); and $0.1 \leq X_2/X_1 \leq 0.9$      (3).

In the wax fraction hydrocracking reactor 30, the FT wax fraction and the uncracked fraction contained in the wax to be processed are hydrocracked and converted to a component corresponding to the middle distillate. In this case, the olefins contained in the FT wax fraction are hydrogenated and converted to paraffin hydrocarbons. In addition, the oxygen-containing compounds such as alcohols contained in the FT wax fraction are hydro-deoxidized, converted to paraffin hydrocarbons and water, and removed. Additionally, in the case of obtaining a base stock for fuel oil as a produced oil, the generation of isoparaffins by hydro-isomerization of normal paraffins contributing to improving its low temperature property (cold flow property) also proceeds simultaneously. On the other hand, a part of the wax to be processed excessively undergoes hydrocracking, and is converted to hydrocarbons corresponding to a naphtha fraction with a boiling point lower than that of hydrocarbons with a boiling point range comparable to the middle distillate intended. In addition, a part of the wax to be processed is further hydrocracked and converted to gaseous hydrocarbons with a number of carbon atoms of 4 or less, such as butanes, propane, ethane, and methane.

The contents of straight-chain hydrocarbons with a boiling point of higher than 360° C. in the FT wax fraction and the uncracked wax that constitute the wax to be processed in the present embodiment are 70% by mass or more, preferably 80% by mass or more, and more preferably 90% by mass or more, respectively, based on the mass of the FT wax fraction and the mass of the uncracked wax, from the viewpoint of efficiently producing the middle distillate.

Examples of the hydrocracking catalyst used in the wax fraction hydrocracking reactor 30 include catalysts in which a metal belonging to Group 8 to Group 10 in the periodic table as a metal having hydrogenation activity is supported by a carrier comprising a solid acid. Here, the periodic table means the long form of the periodic table of the elements, specified by the International Union of Pure and Applied Chemistry (IUPAC). Examples of the suitable carrier include those comprising crystalline zeolites such as ultra stable Y (USY)-type zeolite, Y-type zeolite, mordenite, and β zeolite, and one or more solid acids selected from amorphous composite metal oxides having fire resistance, such as silica alumina, silica zirconia, and alumina boria. Further, as the carrier, those comprising USY-type zeolite, and one or more solid acids selected from silica alumina, alumina boria, and silica zirconia are more preferable, and those comprising USY-type zeolite and alumina boria and/or silica alumina are still more preferable.

USY-type zeolite is one obtained by ultra-stabilizing Y-type zeolite by a hydrothermal treatment and/or an acid treatment; in addition to a fine porous structure called micro pores that Y-type zeolite originally has and whose pore size is not larger than 2 nm, new pores having a pore size in the range of 2 to 10 nm are formed. The average particle size of USY-type zeolite is not particularly limited, but it is preferably not larger than 1.0 μm, and more preferably not larger than 0.5 μm. Moreover, in USY-type zeolite, it is preferable that a molar ratio of silica/alumina (molar ratio of silica to alumina) be 10 to 200, and it is more preferable that the molar ratio be 15 to 100, and it is still more preferable that the molar ratio be 20 to 60.

Moreover, it is preferable that the carrier be constituted by containing 0.1 to 80% by mass of a crystalline zeolite and 0.1 to 60% by mass of an amorphous composite metal oxide having heat resistance.

The carrier can be produced as follows: a carrier composition comprising the solid acid and a binder is molded, and calcined. The proportion of the solid acid to be compounded is preferably 1 to 70% by mass, and more preferably 2 to 60% by mass based on the whole mass of the carrier. Moreover, in the case where the carrier is constituted by containing USY-type zeolite, the proportion of USY-type zeolite to be compounded is preferably 0.1 to 10% by mass, and more preferably 0.5 to 5% by mass based on the whole mass of the carrier. Further, in the case where the carrier is constituted by containing USY-type zeolite and alumina boria, it is preferable that the proportion of USY-type zeolite to alumina boria to be compounded (USY zeolite/alumina boria) be 0.03 to 1 in the mass ratio. Moreover, in the case where the carrier is constituted by containing USY-type zeolite and silica alumina, it is preferable that the proportion of USY-type zeolite to silica alumina to be compounded (USY zeolite/silica alumina) be 0.03 to 1 in the mass ratio.

The binder is not particularly limited, but alumina, silica, titania, and magnesia are preferable, and alumina is more preferable. The amount of the binder to be compounded is preferably 20 to 98% by mass, and more preferably 30 to 96% by mass based on the whole mass of the carrier.

A calcination temperature of the carrier is preferably in the range of 400 to 550° C., more preferably in the range of 470 to 530° C., and still more preferably in the range of 490 to 530° C.

Examples of the metal having hydrogenation activity and belonging to Group 8 to Group 10 in the periodic table specifically include cobalt, nickel, rhodium, palladium, iridium, and platinum. Among them, metals selected from nickel, palladium, and platinum, preferably palladium and platinum are preferably used individually or in combinations of two or more. These metals can be supported on the carrier mentioned above by a standard method such as impregnation and ion exchange. The amount of the metal to be supported is not particularly limited, but it is preferable that in the case where the metal is a metal other than noble metals such as cobalt and nickel, the amount be 2 to 50% by mass as a metal oxide based on the mass of the carrier. In addition, in the case where the metal is a noble metal such as platinum, palladium, rhodium, and iridium, the total amount of the metal is 0.1 to 3.0% by mass based on the whole mass of the carrier. In the case where the content of the metal having hydrogenation activity is less than the lower limit value, hydrocracking tends not to sufficiently proceed. On the other hand, in the case where the content of the metal having hydrogenation activity is more than the upper limit value, dispersion of the metal having hydrogenation activity tends to be decreased to lowered the activity of the catalyst, and cost of the catalyst is increased.

A hydrogen partial pressure in the wax fraction hydrocracking reactor 30 is for example 0.5 to 12 MPa, and 1.0 to 5.0 MPa is preferable.

A liquid hourly space velocity (LHSV) is for example 0.1 to 10.0 $h^{-1}$, and 0.3 to 3.5 $h^{-1}$ is preferable. A ratio of the hydrogen gas and the wax fraction (a ratio of hydrogen gas/oil) is not particularly limited, but it is for example 50 to 1000 NL/L, and 70 to 800 NL/L is preferable. Here, the "LHSV (liquid hourly space velocity)" means a volume flow rate of the wax fraction at the normal state (25° C., 101325 Pa) per capacity of a bed comprising a catalyst packed in a fixed bed flow reactor (catalyst bed), and the unit "$h^{-1}$" is an inverse of a time. In addition, the unit "NL" of a hydrogen capacity in the ratio of hydrogen gas/oil denotes a hydrogen capacity (L) at the normal state (0° C., 101325 Pa).

Furthermore, examples of a reaction temperature in the wax fraction hydrocracking reactor 30 (weight average catalyst bed temperature) can include 180° C. to 400° C., preferably 200° C. to 370° C., more preferably 250° C. to 350° C., and further preferably 280° C. to 350° C. If the reaction temperature is higher than 400° C., the hydrocracking excessively proceeds, and the yield of the middle distillate intended tends to be decreased. Furthermore, the hydrocracking product is colored and is restricted to be used as a base stock for fuel in some cases. On the other hand, if the reaction temperature is lower than 180° C., the hydrocracking of the wax fraction does not proceed sufficiently, and the yield of the middle distillate tends to be decreased. Furthermore, the olefins and the oxygen-containing compounds such as alcohols in the wax fraction tend not to be sufficiently removed. It is to be noted that the reaction temperature is controlled by adjusting temperature settings at an exit of the heat exchanger (not shown) provided on the line 4.

In the present invention, the hydrocracking is performed in which a period for performing hydrocracking of the wax to be processed under a condition where a cracking rate defined by the formula (1) is $X_1$(%) satisfying the formula (2) and a period for performing hydrocracking of the wax to be processed under a condition where the cracking rate is $X_2$(%) satisfying the formula (3) is alternately provided. The condition of the hydrocracking according to the present invention will be described with reference to the drawings.

Figure 2:
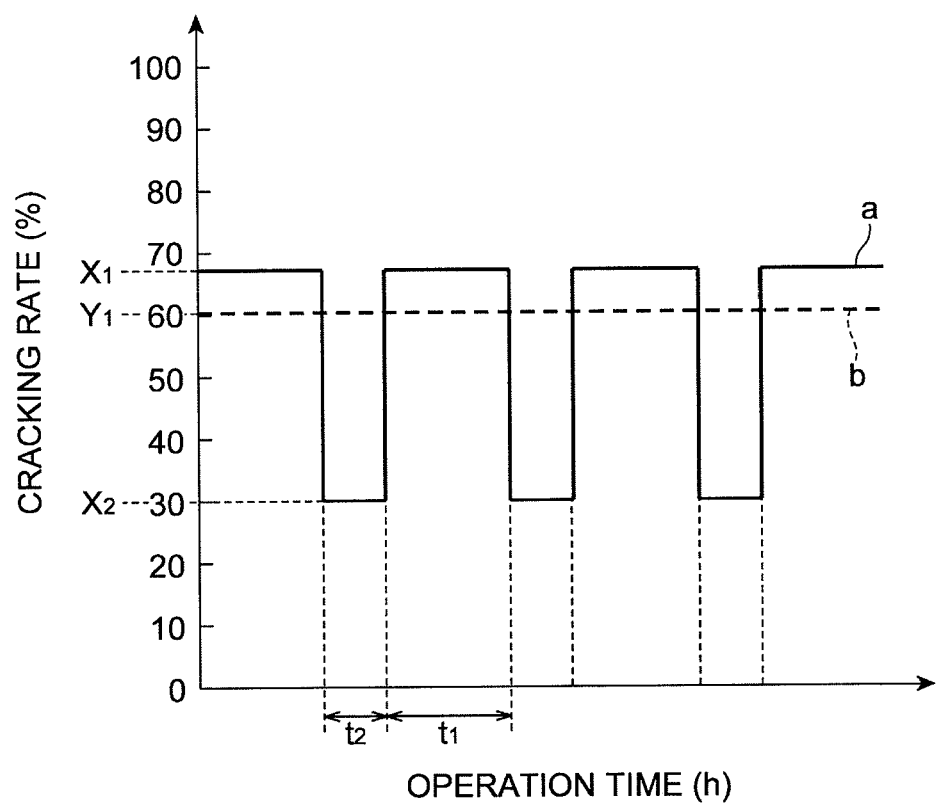
FIG. 2 is a diagram for explaining a condition (cracking rate) of hydrocracking according to the present invention.

FIG. 2 is a diagram for explaining a condition (cracking rate) of the hydrocracking according to the present invention, and is a graph showing a relationship between an operation time and a cracking rate in the wax fraction hydrocracking reactor 30. "a" in FIG. 2 is a graph showing an example of the trend in cracking rate against an operation time in the hydrocracking according to the present invention, and shows that the hydrocracking under a condition where a cracking rate defined by the formula (1) is $X_1(\%)$ satisfying the formula (2) and the hydrocracking under a condition where the cracking rate is $X_2(\%)$ satisfying the formula (3) are alternately carried out. "b" in FIG. 2 is a graph showing an example of the trend in cracking rate against an operation time in the conventional hydrocracking (not performing block operation), and shows that the hydrocracking under a condition where a cracking rate defined by the formula (1) is constantly $Y_1(\%)$ is carried out.

Figure 3:
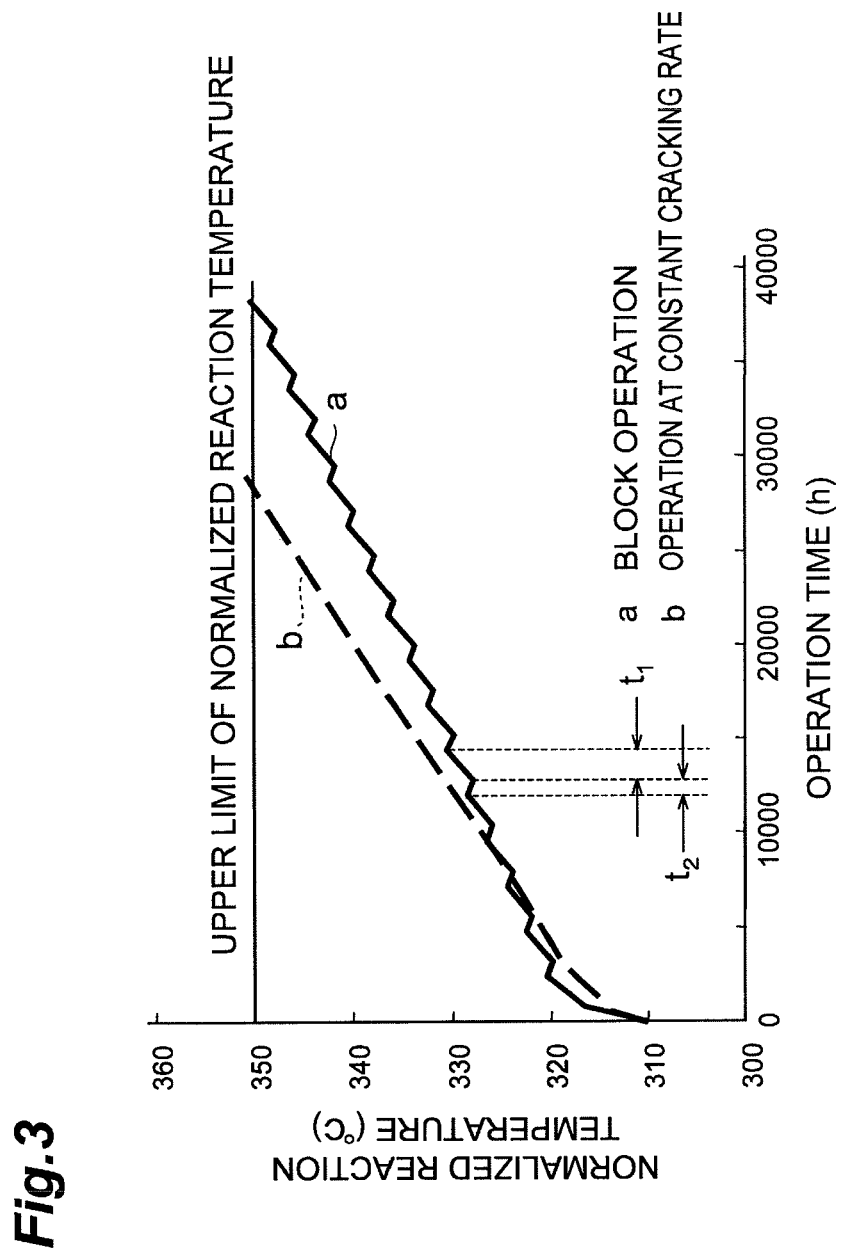
FIG. 3 is a diagram for explaining the trend in activity of a hydrocracking catalyst over time in the hydrocracking according to the present invention.

FIG. 3 is a diagram for explaining the trend in activity of a hydrocracking catalyst over time in the hydrocracking according to the present invention, and a graph showing a relationship between an operation time and a normalized reaction temperature when the hydrocracking is performed so as to give the trend in cracking rate shown in FIG. 2. "a" in FIG. 3 is a graph showing the trend in normalized reaction temperature against an operation time when the block operation is carried out at a high cracking rate and a low cracking rate shown in "a" in FIG. 2. "b" in FIG. 3 is a graph showing the trend in normalized reaction temperature against an operation time when the conventional operation where a cracking rate is constantly kept is carried out. Here, the normalized reaction temperature refers to a reaction temperature for achieving a cracking rate (70%) as a standard at the LHSV ($2.0\ h^{-1}$) as a standard, and is determined by the conversion with the Arrhenius equation from actual operation results. The normalized reaction temperature is an index of the activity of the hydrocracking catalyst, and a relatively high normalized reaction temperature means a relatively low activity of the hydrocracking catalyst. In addition, the rising of the normalized reaction temperature over time during a period for performing hydrocracking at a high cracking rate ($t_1$) means that the reaction temperature needs to be raised over time for keeping the constant cracking rate, namely, the activity of the hydrocracking catalyst is deteriorated over time in $t_1$. Furthermore, the reduction of the normalized reaction temperature during a period for performing hydrocracking at a low cracking rate ($t_2$) means that the activity of the hydrocracking catalyst once deteriorated in $t_1$ is recovered in $t_2$.

In the present embodiment, as shown in "a" in FIG. 3, while the activity of the hydrocracking catalyst is deteriorated during the period for hydrocracking at a high cracking rate ($t_1$), the activity of the hydrocracking catalyst is recovered during the period for hydrocracking at a low cracking rate ($t_2$). As a result, the normalized reaction temperature can be reduced, namely, the deterioration in activity of the hydrocracking catalyst can be suppressed at the same operation time as compared with the case of adopting the conventional operation method of maintaining the constant cracking rate without performing the block operation ("b" in FIG. 3). Then, in the block operation according to the present embodiment, a time until reaching the upper limit of the normalized reaction temperature (350° C. in FIG. 3) can be extended as compared with the case of performing the conventional hydrocracking.

In the present embodiment, $X_1$ is in a range of 30 to 90%, preferably in a range of 40 to 80%, and more preferably in a range of 50 to 75% in terms of improving the yield of the middle distillate and efficiently obtaining the middle distillate. In addition, $X_2/X_1$ is in a range of 0.1 to 0.9, preferably in a range of 0.2 to 0.75, and more preferably in a range of 0.25 to 0.6 in terms of efficiently recovering the activity of the catalyst deteriorated during the period for hydrocracking at a high cracking rate and efficiently producing the middle distillate throughout the period for hydrocracking at a high cracking rate and the period for hydrocracking at a low cracking rate. It is to be noted that in the example of the block operation according to the present embodiment shown in "a" in FIG. 2, while the hydrocracking at the same high cracking rate ($X_1$) and the hydrocracking at the same low cracking rate ($X_2$) are repeated respectively, $X_1$ in a different cycle and $X_2$ in a different cycle may be different from each other, respectively, as long as the formula (2) and the formula (3) are satisfied. In this case, it is preferable that when $X_1$ is determined according to the formula (3), the value at the last cycle be adopted as $X_2$, and when $X_2$ is determined, the value at the last cycle be adopted as $X_1$.

A proportion $t_2/t_1$ of the period for hydrocracking at a low cracking rate ($t_2$) to the period for hydrocracking at a high cracking rate ($t_1$) is preferably about 0.5 to about 2 in terms of efficiently recovering the activity of the catalyst deteriorated during the period for hydrocracking at a high cracking rate ($t_1$) and efficiently producing the middle distillate throughout the period for hydrocracking at a high cracking rate ($t_1$) and the period for hydrocracking at a low cracking rate ($t_2$). In the example of the block operation according to the present embodiment shown in "a" in FIG. 2, while $t_1$ and $t_2$ are constant between different cycles, respectively, they may be different from each other, respectively.

In the present embodiment, a number of repetitions of the hydrocracking at a high cracking rate and a number of repetitions of the hydrocracking at a low cracking rate to be performed during a period from starting of the operation of the wax fraction hydrocracking reactor and then stopping of the operation until replacement or regenerating of the hydrocracking catalyst packed in the reactor are not particularly limited as long as they are alternately performed, but the hydrocracking at a high cracking rate and the hydrocracking at a low cracking rate are performed twice or more and once or more, respectively, in terms of significance of performing the block operation. In addition, when the operation of the wax fraction hydrocracking reactor 30 whose operation has been stopped is started, it may be started under a condition for performing the hydrocracking at a high cracking rate or a condition for performing the hydrocracking at a low cracking rate. In general, the operation of the reactor is often started under a condition where the reaction temperature is lower than that in the usual operation, namely, a condition where the cracking rate is relatively lowered, and then performed so that the reaction temperature (cracking rate) is gradually raised. When a period for starting of this operation is counted as the hydrocracking at a low cracking rate, the hydrocracking at a low cracking rate is preferably performed at least once more.

The cracking rate in the wax fraction hydrocracking reactor 30 can be controlled within the above range by adjusting reaction conditions such as a reaction temperature, a LHSV, a hydrogen pressure, and a ratio of hydrogen/oil. Among them, the reaction temperature is preferably controlled to adjust the cracking rate, in terms of ease of control and impact.

In the present embodiment, the FT wax fraction is preferably a bottom oil obtained by fractionating the FT synthetic oil in the first fractionator 10 at about 360° C. as the cut point, and the uncracked wax which is mixed with the FT wax to form the wax to be processed and sent back to the wax fraction hydrocracking reactor 30 is preferably a bottom oil fractionated in the second fractionator 40 at about 360° C. as the cut point.

In the present embodiment, when the cut point between the middle distillate and the wax fraction is 360° C. in the first fractionator 10 and the second fractionator 40, a ratio of the FT wax fraction fed from the first fractionator 10 to the uncracked wax recycled from the second fractionator 40 in the wax to be processed to be subjected to hydrocracking is approximately determined depending on the cracking rate of the wax to be processed even in any of the period for hydrocracking at a high cracking rate or the period for hydrocracking at a low cracking rate.

The hydrocracking product discharged from the wax fraction hydrocracking reactor 30 is preferably introduced to the gas liquid separator 60 provided in a multi-stage (depicted in a multi-stage in FIG. 1), a liquid component separated from a gaseous component passes through a line 6 and is fed to the second fractionator 40. On the other hand, the gaseous component separated at the gas liquid separator 60, which contains hydrogen gas having gaseous hydrocarbons as a main component, is fed to the middle distillate hydrotreating reactor 20 or the naphtha fraction hydrotreating reactor (not shown) and reused as hydrogen gas for hydroprocessing.

The gas liquid separator for separating the hydrocracking product discharged from the wax fraction hydrocracking reactor 30 into gas and liquid is preferably provided in a multi-stage. In this case, by adopting a procedure of cooling in a multi-stage, troubles such as occurrence of clogging of an apparatus owing to solidification by quenching a component with a high freezing point contained in the hydrocracking product discharged from the wax fraction hydrocracking reactor 30 (in particular, uncracked wax), can be prevented.

With respect to the method for producing a hydrocarbon oil of the present embodiment, in the block operation provided with the period for hydrocracking at a high cracking rate and the period for hydrocracking at a low cracking rate in the wax fraction hydrocracking reactor 30, the activity of the hydrocracking catalyst deteriorated during the period for hydrocracking at a high cracking rate is recovered during the period for hydrocracking at a low cracking rate. Although this mechanism of effect is not clarified, the present inventors presume it as follows. Namely, oxygen-containing compounds and olefins as impurities other than aliphatic hydrocarbons are contained in the FT synthetic oil and the wax fraction derived from the FT synthetic oil (FT wax fraction). These impurities are adsorbed to the hydrocracking catalyst, thereby possibly causing the deterioration in activity of the catalyst over time. On the other hand, the impurities contained in the FT wax fraction are removed in the wax fraction hydrocracking reactor 30. Therefore, the impurities are not substantially contained in the bottom oil (uncracked wax) of the second fractionator obtained by fractionating the hydrocracking product. A proportion of the uncracked wax accounting for the hydrocracking product is increased and an amount of the bottom oil to be discharged from the second fractionator 40 is increased during the period for hydrocracking at a low cracking rate. Since the entire amount of this bottom oil is recycled to the wax fraction hydrocracking reactor 30, a proportion of the uncracked wax to be recycled accounting for the wax to be processed is increased and a proportion of the FT wax fraction containing the impurities is relatively reduced, thereby reducing a content of the impurities in the wax to be processed. It is considered that the flowing of such a wax to be processed through the catalyst bed leads to the reduction in adsorption of the impurities to the catalyst, and furthermore a cleaning effect by the wax to be processed allows a part of the impurities adsorbed to the catalyst to be removed. The present inventors presume that such an effect allows the activity of the catalyst deteriorated during the period for hydrocracking at a high cracking rate to be recovered during the period for hydrocracking at a low cracking rate, and then allows a continuous use time of the catalyst to be extended.

As the hydrotreating catalyst used in the middle distillate hydrotreating reactor 20, catalysts usually used for hydrotreating and/or hydro-isomerizing in petroleum refining or the like, namely, catalysts in which a metal having hydrogenation activity is supported by an inorganic carrier can be used.

As the metal having hydrogenation activity that constitutes the hydrotreating catalyst, one or more metals selected from the group consisting of metals in Groups 6, 8, 9, and 10 in the periodic table of the elements are used. Specific examples of these metals include noble metals such as platinum, palladium, rhodium, ruthenium, iridium, and osmium, or cobalt, nickel, molybdenum, tungsten, and iron; preferable are platinum, palladium, nickel, cobalt, molybdenum, and tungsten, and more preferable are platinum and palladium. Moreover, a plurality of these metals are also preferably used in combination; examples of a preferable combination in this case include platinum-palladium, cobalt-molybdenum, nickel-molybdenum, nickel-cobalt-molybdenum, and nickel-tungsten.

Examples of the inorganic carrier that constitutes the hydrotreating catalyst include metal oxides such as alumina, silica, titania, zirconia, and boria. These metal oxides may be used individually, or used as a mixture of two or more thereof, or a composite metal oxide such as silica alumina, silica zirconia, alumina zirconia, and alumina boria. From the viewpoint of efficiently proceeding hydro-isomerizing of normal paraffins at the same time of hydrotreating, it is preferable that the inorganic carrier be a composite metal oxide having solid acidity such as silica alumina, silica zirconia, alumina zirconia, and alumina boria. Moreover, a small amount of zeolite may be contained in the inorganic carrier. Further, in order to enhance the moldability and mechanical strength of the carrier, a binder may be compounded in the inorganic carrier. Examples of a preferable binder include alumina, silica, and magnesia.

In the case where the metal is the above-described noble metal, it is preferable that the content of the metal having hydrogenation activity in the hydrotreating catalyst be approximately 0.1 to 3% by mass as the metal atom based on the mass of the carrier. Moreover, in the case where the metal is a metal other than the above-described noble metal, it is preferable that the content be approximately 2 to 50% by mass as a metal oxide based on the mass of the carrier. In the case where the content of the metal having hydrogenation activity is less than the lower limit value, hydrotreating and hydro-isomerizing tend not to sufficiently proceed. On the other hand, in the case where the content of the metal having hydrogenation activity is more than the upper limit value, dispersion of the metal having hydrogenation activity tends to be deteriorated to lower the activity of the catalyst, and cost of the catalyst is increased.

In the middle distillate hydrotreating reactor 20, the middle distillate (which contains normal paraffins with approximately $C_{11}$ to $C_{20}$ as a main component) is hydrotreated. In this hydrotreating, olefins that are a by-product of the FT synthesis reaction contained in the middle distillate are hydrogenated to be converted into paraffin hydrocarbons. Moreover, oxygen-containing compounds such as alcohols are converted into paraffin hydrocarbons and water by a hydro-deoxygenation reaction. Moreover, in parallel with the hydrotreating reaction, the hydro-isomerizing reaction of normal paraffins that constitute the middle distillate proceeds to produce isoparaffins. In the case where the hydrotreated middle distillate is used as the base stock for fuel oil, the isoparaffins produced by the hydro-isomerizing reaction are a component contributing to improvement in fluidity at a low temperature, and it is preferable that the production rate be high.

The reaction condition in the middle distillate hydrotreating reactor 20 is not limited, but the following reaction condition can be selected. Namely, examples of the reaction temperature (weight average catalyst bed reaction temperature) include 180 to 400° C., 200 to 370° C. is preferable, 250 to 350° C. is more preferable, and 280 to 350° C. is particularly preferable. If the reaction temperature is higher than 400° C., not only cracking into the light fraction tends to proceed to reduce the yield of the middle distillate, but also the product tends to be colored and to be restricted for use as the base stock for fuel oil. On the other hand, if the reaction temperature is lower than 180° C., oxygen-containing compounds such as alcohols tend not to sufficiently be removed to remain, and production of isoparaffins by the hydro-isomerizing reaction tends to be suppressed. Examples of the hydrogen partial pressure include 0.5 to 12 MPa, and 1.0 to 5.0 MPa is preferable. If the hydrogen partial pressure is lower than 0.5 MPa, hydrotreating and hydro-isomerizing tend not to sufficiently proceed, on the other hand, if the hydrogen partial pressure is higher than 12 MPa, high pressure resistance is demanded for the apparatus, and facility cost tends to be increased. Examples of the liquid hourly space velocity (LHSV) of the crude middle distillate include 0.1 to 10.0 $h^{-1}$, and 0.3 to 3.5 $h^{-1}$ is preferable. If the LHSV is less than 0.1 $h^{-1}$, cracking into the light fraction tends to proceed to reduce the yield of the middle distillate, and productivity tends to be reduced, on the other hand, if the LHSV is more than 10.0 $h^{-1}$, hydrotreating and hydro-isomerizing tend not to sufficiently proceed. Examples of the ratio of hydrogen/oil include 50 to 1000 NL/L, and 70 to 800 NL/L is preferable. If the ratio of hydrogen/oil is less than 50 NL/L, hydrotreating and hydro-isomerizing tend not to sufficiently proceed, on the other hand, if the ratio of hydrogen/oil is more than 1000 NL/L, a large-sized hydrogen feeding apparatus and the like tend to be needed.

The effluent from the middle distillate hydrotreating reactor 20, from which a gas mainly containing unreacted hydrogen gas has been separated in the gas liquid separator 50 provided on the line 5, is transferred through the line 5, mixed with the hydrocracking product of the liquid wax fraction transferred by the line 6, and fed to the second fractionator 40. In addition, the gas mainly containing hydrogen gas separated in the gas liquid separator 50 is fed to the wax fraction hydrocracking reactor 30, and reused.

It is preferable in such an middle distillate hydrotreating reactor 20 that hydro-isomerizing proceed so that the middle distillate hydrotreated has a sufficient low temperature property (cold flow property) as the base stock for fuel oil and normal paraffins that constitute the raw middle distillate are converted to isoparaffins at a high conversion, and it is preferable that the middle distillate hydrotreating reactor 20 be operated so that oxygen-containing compounds such as alcohols and olefins contained in the raw middle distillate are sufficiently removed.

In the second fractionator 40, a plurality of cut points are set depending on the hydrocarbon oil to be distilled, so that a mixed oil of a liquid component in the products discharged from the middle distillate hydrotreating reactor 20 and a liquid component in the hydrocracking product discharged from the wax fraction hydrocracking reactor 30 is fractionated.

In the present embodiment, for example, the cut points are set at about 150° C. and about 360° C., thereby making it possible to distill the naphtha fraction by the line 7, to distill the middle distillate by the line 8, and to discharge the bottom oil containing the uncracked wax as a main component by the line 8. In addition, an additional cut point may be set at about 250° C. between about 150° C. and about 360° C. to further fractionate the middle distillate into a kerosene fraction and a gas oil fraction.

The present invention is not limited to the above-described embodiment, and alterations, substitutions, additions and the like can be made without departing from the spirit of the present invention. For example, the raw wax in the method for producing a hydrocarbon oil of the present invention is not limited to the FT wax fraction containing 70% by mass or more of straight-chain hydrocarbons with a boiling point of higher than 360° C., and may be, for example, a wax derived from petroleum, such as a slack wax, or a mixture of the FT wax fraction and these waxes.

EXAMPLES

Hereinafter, the present invention will be described in more detail by Examples, but it is not to be limited the following Examples.

Example 1

<Preparation of Hydrocracking Catalyst>

A composition containing 3.0% by mass of powdered USY zeolite with the average particle size of 0.4 µm (molar ratio of silica/alumina: 37), 57.0% by mass of powdered alumina boria (mass ratio of alumina/boria: 5.6), and 40.0% by mass of powdered alumina was extrusion molded into a cylinder with a diameter of about 1.5 mm and a length of about 3 mm by a standard method, and the obtained mold was calcined in air at 500° C. for 1 hour to obtain a carrier. This carrier was impregnated with an aqueous solution of 0.8% by mass dichlorotetraammine platinum (II) as a platinum atom based on the mass of the carrier, dried at 120° C. for 3 hours, and then calcined in air at 500° C. for 1 hour to obtain a hydrocracking catalyst.

<Raw Wax (FT Wax Fraction)>

A synthetic oil produced by a FT synthesis reaction (FT synthetic oil) was fractionated in a fractionator with the cut point being 360° C., and the obtained bottom oil was used as a FT wax fraction. This FT wax fraction was analyzed in terms of its composition, and straight-chain hydrocarbons with a number of carbon atoms of 20 to 80 were as a main component, and a content of straight-chain hydrocarbons with a boiling point of higher than 360° C. was 95% by mass based on the whole mass of the FT wax fraction.

<Hydrocracking>

First, the hydrocracking catalyst was packed in a fixed bed flow reactor, and reduced under a stream of hydrogen at 345° C. for 4 hours to be activated. Then, the FT wax fraction, hydrogen gas, and an uncracked wax recovered from a hydrocracking product described later by fractionating and recycled were continuously fed to the reactor, and subjected to hydrocracking by the block operation where a period for hydrocracking at a high cracking rate and a period for hydrocracking at a low cracking rate were alternately provided.

First, an operation for hydrocracking at a high cracking rate was performed. Under conditions where a reaction temperature was about 310° C., a feed amount of the FT wax fraction was 1221 L/h, and a ratio of hydrogen/oil (volume flow rate of hydrogen gas at standard state/volume flow rate of oil to be processed) was 700 NL/L, a hydrocracking product discharged from the reactor was fed to a gas liquid separator installed in a two-stage, and separated into a gas content containing hydrogen gas and gaseous hydrocarbons as main components, and liquid hydrocarbons, and the liquid hydrocarbons were fed to a fractionator. The liquid hydrocarbons were fractionated in the fractionator into a light fraction with a boiling point of lower than about 150° C., the middle distillate with a boiling point of about 150° C. to about 360° C., and an uncracked wax with a boiling point of higher than about 360° C., with the cut points being 150° C. and 360° C. The light fraction, the middle distillate, and the uncracked wax were discharged from the top of the fractionator, the middle of the fractionator, and the bottom of the fractionator, respectively. Then, all of the uncracked wax was sent back upstream of the reactor, mixed with the FT wax fraction to form a wax to be processed, and the wax was fed to the reactor.

The reaction temperature was adjusted so that the reaction was stabilized to a steady state and a measurement of the cracking rate obtained by analyzing the hydrocracking product and defined by the formula (1) was 67%, and as a result, the reaction temperature was 311° C. as the normalized reaction temperature. In this case, the flow rate of the uncracked wax to be sent back to the reactor was 600 L/h, the yield amount of the middle distillate intended was 916 L/h, and the yield of the middle distillate was 75%, which was expressed by a proportion of the yield amount in terms of mass of the middle distillate against the amount per unit time in terms of mass of the FT wax fraction to be fed.

Thereafter, the reduction in cracking rate due to the degradation of the hydrocracking catalyst along with an operation time was compensated with the increase in reaction temperature over time, and the cracking rate was kept to 67%. Then, when 1600 hours elapsed after starting of the operation, the reaction conditions were changed in order to switch the operation to an operation for hydrocracking at a low cracking rate.

The operation for hydrocracking at a low cracking rate was performed under the same conditions as in the hydrocracking at a high cracking rate except that the amount of the FT wax fraction to be fed was 257 L/h and the normalized reaction temperature was 307° C. when the cracking rate at a steady state was adjusted so as to be 30%. In this operation, the amount of the uncracked wax to be fed was maintained to 600 L/h, the yield amount of the middle distillate intended was 193 L/h, and the yield of the middle distillate was 75%.

Thereafter, the normalized reaction temperature of the hydrocracking catalyst was decreased (the activity of the catalyst deteriorated during the period for hydrocracking at a high cracking rate was recovered) along with an operation time, and accordingly the reaction temperature was lowered over time in order to maintain the cracking rate to be 30%. Then, once the hydrocracking at a low cracking rate was performed for 800 hours, the reaction conditions were changed in order to perform the hydrocracking at a high cracking rate again.

The second operation for hydrocracking at a high cracking rate was performed under the same conditions as those in the first operation for hydrocracking at a high cracking rate. However, the reaction temperature was a temperature adjusted so that the cracking rate at the starting point of the operation period was 67%, and thereafter the reaction temperature was raised over time in order to maintain the cracking rate to 67% depending on the deterioration in activity of the catalyst over time at the operation. The second operation for hydrocracking at a high cracking rate was also performed for 1600 hours.

Thereafter, the operation for hydrocracking at a low cracking rate (30%) and the operation for hydrocracking at a high cracking rate (67%) were alternately repeated, as described above.

The yield of the middle distillate was maintained to 75% based on the FT wax fraction in each of the operation for hydrocracking at a high cracking rate and the operation for hydrocracking at a low cracking rate.

The time from starting the operation until the normalized reaction temperature reached 350° C. set as the upper limit value was 38400 hours. The operation conditions and results are shown in Table 1. In addition, "a" in FIG. 3 represents a relationship between the operation time and the normalized reaction temperature in this Example 1.

Comparative Example 1

Hydrocracking where the cracking rate was constant and the amount of the FT wax fraction to be fed was constant throughout the whole operation period was performed using the same reactor, hydrocracking catalyst, and FT wax fraction as those in Example 1. The operation conditions are shown in Table 1.

Here, the cracking rate was adjusted so that the yield of the middle distillate was the same as the yield of the middle distillate in Example 1 (75%), and as a result, it was set to 60%. The normalized reaction temperature was 310° C. in order that the cracking rate was 60% at the time of starting the operation. Then, the reaction temperature was raised over time so as to maintain this cracking rate and to compensate for the activity of the catalyst to be deteriorated over time.

In addition, the amount of the FT wax fraction being a raw wax, to be fed, was set so as to be the same as the weighted average value of the amounts of the FT wax fractions to be fed during the period for hydrocracking at a high cracking rate and the period for hydrocracking at a low cracking rate by the ratio of the operation times of Example 1. These conditions were set, so that the production efficiency of the middle distillate per unit time (the yield amount of the middle distillate) was the same as the average value of that in the operation for performing hydrocracking at a high cracking rate and that in the operation for performing hydrocracking at a low cracking rate in Example 1.

The time from starting the operation until the normalized reaction temperature reached 350° C. set as the upper limit value was 28000 hours. The results are shown in Table 1. In addition, "b" in FIG. 3 represents a relationship between the operation time and the normalized reaction temperature in this Comparative Example 1.

Example 2

The hydrocracking by a block operation of high cracking rate (78%)/low cracking rate (20%) was performed using the same reactor, hydrocracking catalyst, and FT wax fraction as those in Example 1 according to the same procedure as in Example 1 and the operation conditions described in Table 2. In the first operation for hydrocracking at a high cracking rate, the normalized reaction temperature was 314° C. in order that the cracking rate was 78% at the time of starting the operation. In addition, the normalized reaction temperature was 309° C. in order that the cracking rate was 20% at the time of starting the first operation for hydrocracking at a low cracking rate. The yield of the middle distillate was 75% throughout the whole period.

The time from starting the operation until the normalized reaction temperature reached 350° C. set as the upper limit value was 40000 hours. The results are shown in Table 2.

Comparative Example 2

To Example 2, the same relationship between Example 1 and Comparative Example 1 as described above is applied, that is, the amount of the FT wax fraction to be fed was constantly set so as to be equal to the time-weighted average amount of the FT wax fraction to be fed in Example 2, and was adjusted so that the yield of the middle distillate was the same as that of the middle distillate in Example 2 (75%) throughout the whole period according to the conditions shown in Table 2, and thus the hydrocracking at the constant cracking rate (70%) was performed. The normalized reaction temperature was 313° C. in order that the cracking rate was 70% at the time of starting the operation.

The time from starting the operation until the normalized reaction temperature reached 350° C. set as the upper limit value was 30400 hours. The results are shown in Table 2.

TABLE 1

| | Example 1 | | |
|---|---|---|---|
| | Operation at high cracking rate | Operation at low cracking rate | Comparative Example 1 |
| Cracking rate (%) | 67 | 30 | 60 |
| $X_2/X_1$ | | 0.45 | — |
| Block operation time per one operation (h) | 1600 | 800 | — |
| Amount of FT wax fraction to be fed (L/h) | 1221 | 257 | 900 |
| Weighted average amount of FT wax fraction to be fed (L/h) | 900 | | |
| Amount of uncracked wax to be fed (L/h) | 600 | 600 | 600 |
| LHSV (h$^{-1}$) | 1.8 | 0.86 | 1.5 |
| Ratio of hydrogen/oil (NL/L) | 700 | 700 | 700 |
| Normalized reaction temperature at the time of starting operation (° C.) | 311 | 307 | 310 |
| Yield amount of the middle distillate (L/h) | 916 | 193 | 675 |
| Yield of the middle distillate (%) | 75 | 75 | 75 |
| Continuous operation time (h) | 38400 | | 28000 |

TABLE 2

| | Example 2 | | |
|---|---|---|---|
| | Operation at high cracking rate | Operation at low cracking rate | Comparative Example 2 |
| Cracking rate (%) | 78 | 20 | 70 |
| $X_2/X_1$ | | 0.26 | — |
| Block operation time per one operation (h) | 80 | 48 | — |
| Amount of FT wax fraction to be fed (L/h) | 2150 | 150 | 1400 |
| Weighted average amount of FT wax fraction to be fed (L/h) | 1400 | | |
| Amount of uncracked wax to be fed (L/h) | 600 | 600 | 600 |
| LHSV (h$^{-1}$) | 2.7 | 0.75 | 2.0 |
| Ratio of hydrogen/oil (NL/L) | 700 | 700 | 700 |
| Normalized reaction temperature at the time of starting operation (° C.) | 314 | 309 | 313 |
| Yield amount of the middle distillate (L/h) | 1613 | 113 | 1050 |
| Yield of the middle distillate (%) | 75 | 75 | 75 |
| Continuous operation time (h) | 40000 | | 30400 |

It was revealed from the results in Table 1 and Table 2 that the hydrocracking by the block operation of high cracking rate/low cracking rate according to the method for producing a hydrocarbon oil of the present invention is performed, thereby making it possible to suppress the degradation of the hydrocracking catalyst over time and considerably extend a continuously operable time, as compared with the case of performing the hydrocracking at the constant cracking rate throughout the whole period.

INDUSTRIAL APPLICABILITY

According to the present invention, the method for producing a hydrocarbon oil can be provided which can suppress the degradation of a hydrocracking catalyst and extend a continuous use time without reducing the efficiency of hydrocracking of a wax fraction.

REFERENCE SIGNS LIST

10 . . . First fractionator, 20 . . . Middle distillate hydrotreating reactor, 30 . . . Wax fraction hydrocracking reactor, 40 . . . Second fractionator, 50, 60 . . . Gas liquid separator, 100 . . . Apparatus for producing a hydrocarbon oil.

The invention claimed is:

1. A method for producing a hydrocarbon oil, comprising performing a hydrocracking by continuously feeding, to a hydrocracking reactor containing a hydrocracking catalyst, a wax to be processed comprising: a raw wax containing 70% by mass or more of straight-chain hydrocarbons with a boiling point of higher than 360° C.; and an uncracked wax containing 70% by mass or more of straight-chain hydrocarbons with a boiling point of higher than 360° C., which uncracked wax is separated from a hydrocracking product discharged from the reactor, to thereby yield a hydrocarbon oil comprising hydrocarbons with a boiling point of 360° C. or lower, wherein the following periods are alternately provided: a period for performing hydrocracking of the wax to be processed under a condition where a cracking rate defined by the following formula (1) is $X_1$(%) satisfying the following formula (2); and a period for performing hydrocracking of the wax to be processed under a condition where the cracking rate is $X_2$(%) satisfying the following formula (3), Cracking rate (%)=((content of hydrocarbons with boiling point of higher than 360° C. in 1 g of wax to be processed)−(content of hydrocarbons with boiling point of higher than 360° C. in 1 g of hydrocracking product))×100/(content of hydrocarbons with boiling point of higher than 360° C. in 1 g of wax to be processed)     (1);

$$30 \leq X_1 \leq 90 \quad (2); \text{ and}$$

$$0.1 \leq X_2/X_1 \leq 0.9 \quad (3).$$

2. The method according to claim 1, wherein the raw wax comprises a wax produced by a Fischer-Tropsch synthesis reaction.

* * * * *